UNITED STATES PATENT OFFICE.

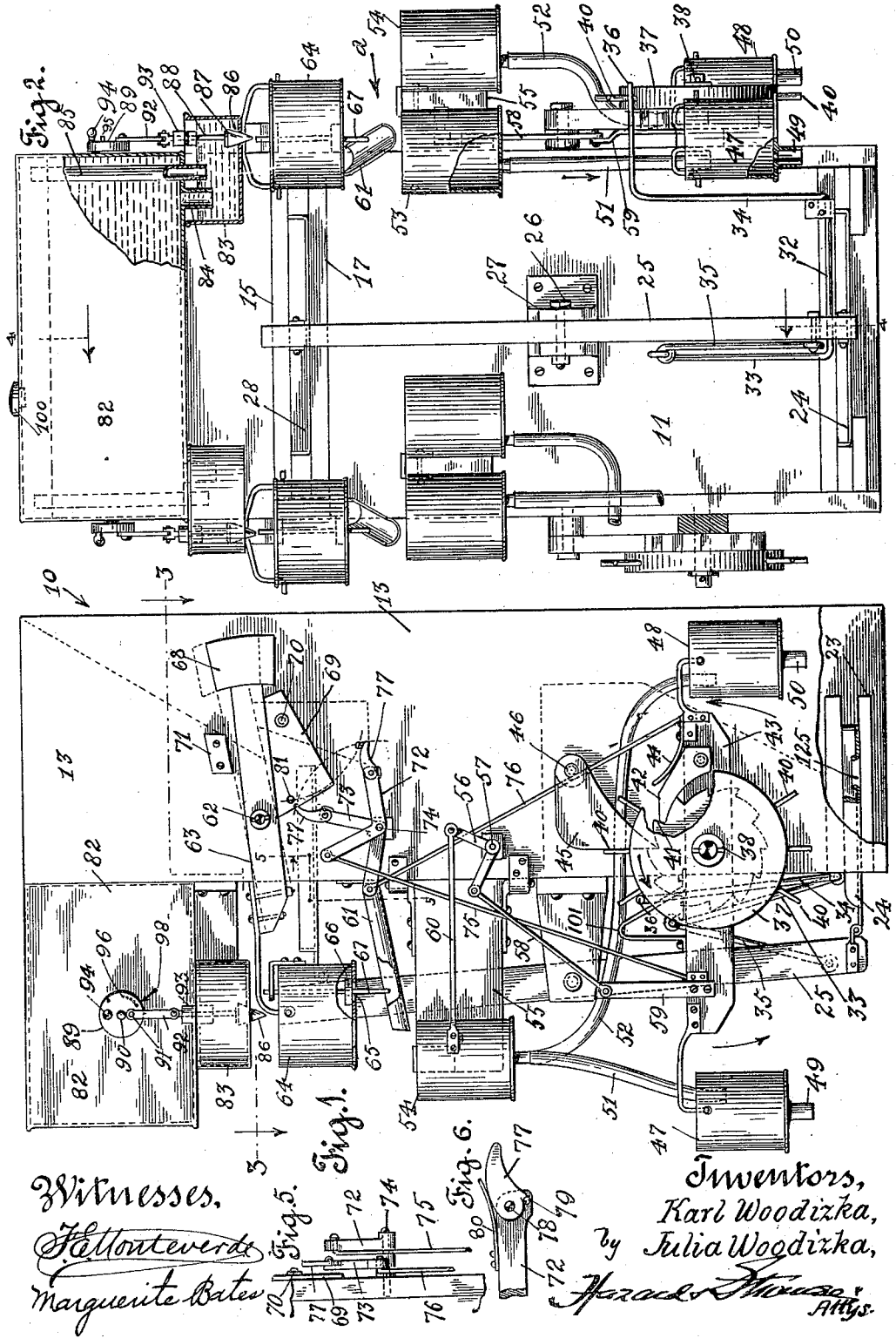

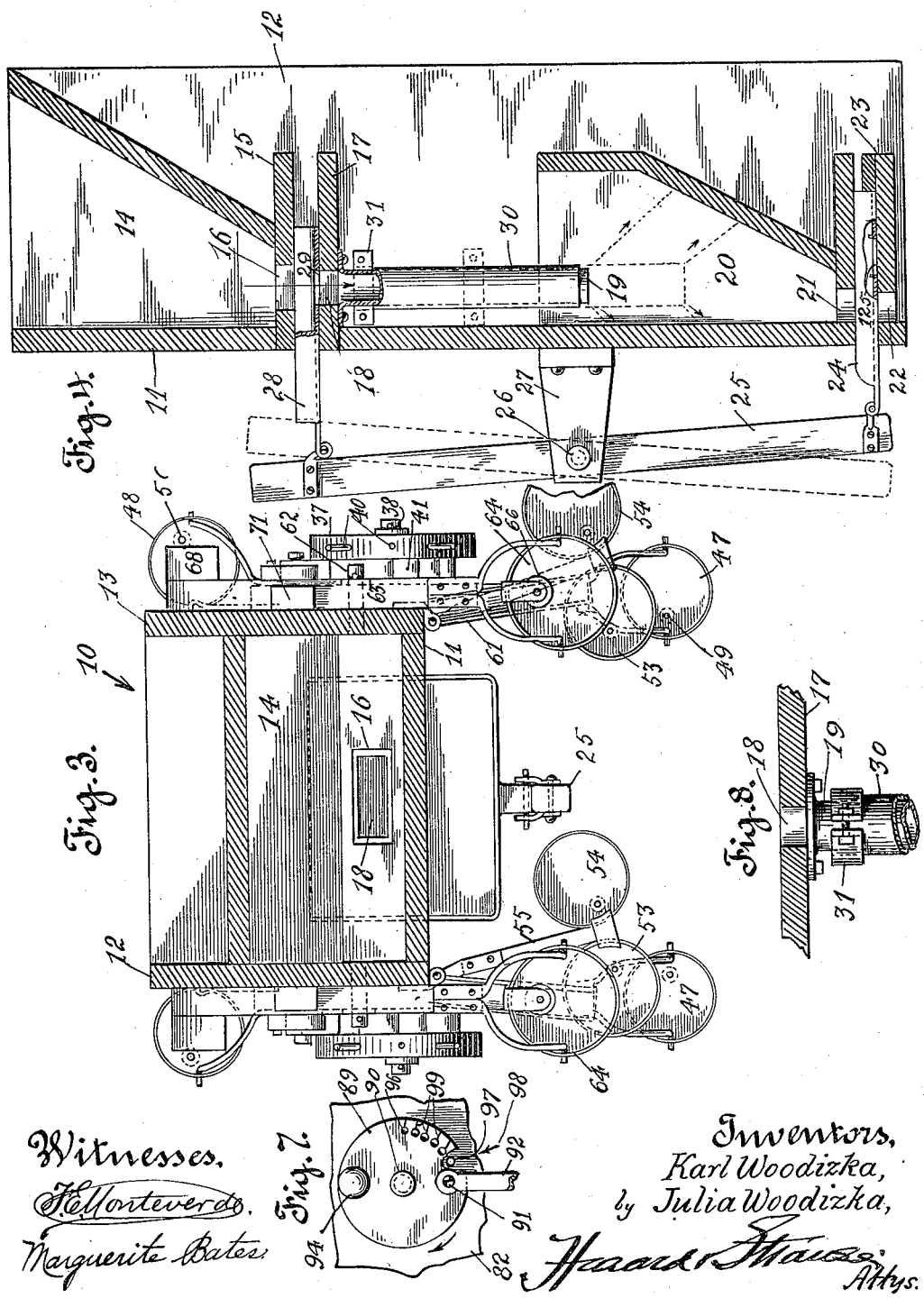

KARL WOODIZKA AND JULIA WOODIZKA, OF LOS ANGELES, CALIFORNIA.

AUTOMATIC FEED AND WATER DISPENSER.

1,134,934.　　　　　Specification of Letters Patent.　　Patented Apr. 6, 1915.

Application filed September 14, 1914.　Serial No. 861,516.

*To all whom it may concern:*

Be it known that we, KARL WOODIZKA, a citizen of Austria-Hungary, and JULIA WOODIZKA, a citizen of Great Britain, residing at Los Angeles, in the county of Los Angeles, State of California, have invented new and useful Improvements in Automatic Feed and Water Dispensers, of which the following is a specification.

This invention relates to an apparatus for automatically delivering feed and water at predetermined intervals which is particularly adapted for use in delivering food and drinking water to poultry.

It is the object of this invention to provide a mechanism which will discharge feed and water at predetermined intervals and which can be adjusted to regulate the intervals of time between its delivering operations.

Another object is to provide a feed and water dispenser which is actuated automatically by the water delivered therefrom, and in which the timing of the discharging operations is effected by controlling the flow of the water through the apparatus.

Another object is to provide a device of the above character in which water and food will be delivered simultaneously at predetermined intervals and water alone delivered at a time intermediate the delivery of the food and water.

Another object is to provide means in a device of this class for regulating the quantity of the feed ejected therefrom.

The invention is illustrated in the accompanying drawings, in which:

Figure 1 is a view of the apparatus in side elevation, with parts broken away. Fig. 2 is a view of same in front elevation with parts removed. Fig. 3 is a plan view, and horizontal section on the line 3—3 of Fig. 1. Fig. 4 is a detail vertical section on the line 4—4 of Fig. 2, with parts broken away. Fig. 5 is a detail in elevation on the line 5—5 of Fig. 1. Fig. 6 is a detail of the spring pressed arm. Fig. 7 is a detail of the water timing device. Fig. 8 is a detail of the feed controlling chute.

More specifically, 10 indicates the body portion of the device which consists of a front panel 11 having rearwardly extending side panels 12 and 13 affixed to its vertical edges; this structure being designed to be supported on a frame or hung on a wall above the ground. Formed in the upper portion of the space between the side walls 12 and 13 is a hopper 14, the bottom of which is formed by a horizontally extending panel the bottom 15 of which is formed with an opening 16, and spaced from the bottom 15 is a panel 17 having an opening 18 registering with the opening 16 which communicates with a downwardly extending tube 19 the lower end of which opens within a hopper 20 formed on the rear face of the panel 11 and arranged below the hopper 14. The hopper 20 is formed with a discharge opening 21 which registers with an aperture 22 in a guide panel 23 arranged beneath the lower end of the hopper 20.

Interposed between the guide panel 23 and the bottom of the hopper 20 is a plate 24 which is slidable on the guide member 23 and is formed with an aperture 125 adapted to register with the apertures 21 and 22. This plate 24 is pivotally connected to a vertically extending rocker arm 25 pivoted at 26 on a bracket 27 mounted on the forward face of the panel 11. The upper end of the rocker arm 25 is pivotally connected to a plate 28 which extends through the panel 11 and is slidable between the guide panel 17 and the bottom 15 of the hopper 14; the plate 28 having an aperture 29 therein adapted to register with the openings 16 and 18. The apertures 125 and 29 in the plates 24 and 28 are so arranged in relation to each other and to the discharge openings 16 and 21 of the hoppers 14 and 20 respectively that when the aperture 29 registers with the discharge opening 16 of the hopper 14 the aperture 125 will be offset in relation to the discharge opening 21 of the hopper 20 as shown in Fig. 4 so that granular materials in the hopper 14 will be discharged through the tube 19 into the hopper 20 and there contained while the parts are thus positioned; the hopper 14 being closed and the hopper 20 opened when the plates 24 and 28 are shifted to position the aperture 125 in the plate 24 in register with the opening 21 and the aperture 29 is moved out of register with the port 16. This operation of the plates 24 and 28 are effected by rocking the rocker arm 25 as will be later described.

As a means for regulating the volume of the granular materials delivered from the hopper 14 to the hopper 20 an extension tube 30 is slidably mounted on the tube 19 and is adapted to be secured in various positions in relation to the latter by means of a clamp 31 mounted on the upper end of the telescoping tube 30 adapted to frictionally engage the tube 19. By varying the distance between the lower end of the extension tube 30 and the bottom of the hopper 20 as indicated in dotted lines in Fig. 4 the volume of materials delivered to the hopper 20 may be regulated accordingly.

Mounted on the panel 11 on the front face thereof immediately above the slot therein through which the plate 24 extends in a rock shaft 32 which is formed with parallel upwardly extending arms 33 and 34 on its ends; the arm 33 being connected to a link 35 which connects with the lower portion of the rocker arm 25 and the arm 34 has a horizontally extending portion 36 on its upper end which projects beyond the outer face of the side panel 13 over the periphery of a wheel 37 revolubly mounted on a spindle 38 secured to the side panel 13.

Mounted on the periphery of the wheel 37 is a series of pins 40 which are adapted to successively engage the member 36 on the arm 34 as the wheel 37 is revolved to rock the lower end of the arm 25 outwardly as will be later described.

The wheel 37 is formed with ratchet teeth 41 on its inner face which are normally engaged by a pawl 42 pivotally mounted on a horizontally extending rocker arm 43 which rocker arm 43 is pivoted on the spindle 38 and has its forward end extending beyond the outer face of the panel 11; a spring 44 on the rocker 43 bearing against the pawl 42 to normally maintain the latter in engagement with the ratchet teeth 41. A stop pawl 45 pivoted at 46 on the side panel 13, which pawl normally engages the ratchet teeth 41 to prevent rearward rotation of the wheel 37.

Pivotally suspended in brackets on the outer ends of the rocker arm 43 are buckets 47 and 48 having discharge tubes 49 and 50 in the bottoms thereof which open to a trough arranged therebeneath, not shown.

Leading from the buckets 47 and 48 are flexible conduits 51 and 52 connecting with a pair of buckets 53 and 54 mounted on an arm 55 pivoted on the panel 11 to swing in a horizontal direction; the arm 55 being designed to be rocked horizontally simultaneous with the vertical rocking movement of the arm 43 through suitable connections therebetween. The connection between the arms 43 and 55 consists of a bell crank lever 56 pivoted at 57 on the side panel 13, a link 58 connecting with an upwardly extending bracket 59 on the forward end of the arm 43, and a horizontally extending link 60 connecting with the other arm of the bell crank lever 56 and attached to the bucket 53. By this arrangement a vertical movement of the arm 43 will effect a horizontal movement of the arm 55 to move the buckets 53 and 54 thereon alternately beneath a trough 61 mounted on the front panel 11. Mounted on a pivot pin 62 on the side panel 13 is a lever 63 the outer end of which carries a pivotally suspended bucket 64 arranged over the trough 61 and having a discharge opening 65 positioned in alinement with the trough 61 which opening is normally closed by a valve 66 having a downwardly projecting stem 67 adapted to be engaged by the bottom of the trough 61 to lift the valve from its seat when the bucket 64 is in its lowermost position.

The lever 63 is provided with a weight 68 on the end thereof opposite the bucket 64 which overbalances the bucket 64 when the latter is empty and normally retains it in its uppermost position with the valve stem 67 out of contact with the trough 61; the downward movement of the inner end of the lever 63 being limited by a pivoted stop block 69 mounted on a pin 70 carried by the side panel 13. The stop block 69 is designed to both limit the downward movement of the inner end of the lever 63 and also act to retain the inner end of the lever 63 in its uppermost position against a fixed stop 71 when the lever is shifted as indicated in dotted lines in Fig. 1, as will be later described; the pivoted stop block 69 being normally held in the position indicated in full lines in Fig. 1 by the action of the weight 68 and adapted to gravitate into the position indicated in dotted lines on upward movement of the inner end of the lever 63.

Means are provided for restoring the stop block 69 to its uppermost position controlled by the rocking movement of the arm 43. This means consists of a pair of bell crank levers 72 and 73 pivoted by a pin 74 to the side panel 13, alongside of each other with the innermost bell crank lever 73 positioned to clear the outer face of the stop block 69, as particularly shown in Fig. 5. The outer arms of the bell crank levers 72 and 73 are connected to the outer and inner ends of the arm 43 by means of rods 75 and 76 respectively.

Mounted on the inner end of each of the bell crank levers 72 and 73 is a pivoted arm 77 particularly illustrated in Fig. 6; the arm 77 being connected to the bell crank lever by means of a pivot pin 78 and is limited in its downward movement by a pin 79 on the bell crank lever adapted to engage a shoulder on the arm 77; the arm being normally maintained with the shoulder thereon against the pin 79 by gravity or by the operation of a spring 80 on the bell crank lever bearing against the upper face of the arm 77.

The arms 77 are designed to alternately engage a pin 81 projecting from the outer face of the pivoted stop block 69 adjacent its outer end; the pin 81 moving into the path of travel of the lowermost arm 77 when the block 69 gravitates to its lowermost position in such manner that when the valve crank lever carrying the arm positioned to engage the pin 81 is rocked the block 69 will be caused to move in an upward direction.

The path of travel of the outer ends of the arms 77 is such that they will clear the pin 81 when the block 69 is in its uppermost position; the lever 63 is engaging the block 69 operating to hold the latter in its uppermost position with the pin 81 clear of the uppermost arm 77 as shown in Fig. 1.

Mounted on the panel 11 at its upper end is a closed tank or reservoir 82 adapted to receive a quantity of water which is introduced into the reservoir through an inlet opening normally closed by a cap 100. The reservoir is fitted with a trap outlet, here shown as consisting of a pan 83 arranged beneath the reservoir into which a tube 84 opening to the interior of the tank 18 through the bottom thereof extends. The lower end of the tube 84 is designed to extend below the surface of the water in the pan 83 to seal the tube and prevent the discharge of the water from the reservoir 82 until the level of the water in the pan 83 falls below the lower end of an air conduit 85, the lower end of which opens to the pan 83 a short distance above the lower end of the tube 84, the upper end of which extends into the reservoir 82 and opens adjacent the top thereof.

The pan 83 is formed with a discharge opening 86 which is arranged above the bucket 64 and is fitted with a cone-valve 87 mounted on a vertically adjustable stem 88; the valve 87 being designed to be positioned in the discharge opening 86 in such relation thereto as to regulate the flow of the water therethrough, the valve being adjusted by means of a disk 89 pivoted at 90 on the end of the reservoir 82. This disk 89 carries a wrist pin 91 connecting with a link 92 which extends downwardly and is pivoted to the upper end of the valve stem 88 above a guide bearing 93 in which the valve stem is reciprocally mounted. The wrist pin 91 is eccentric to the pivotal mounting of the disk 89 so that slight rotation of the disk by means of a handle 94 thereon will effect a reciprocal movement of the valve stem 88 and valve 87. The disk 89 is held against rotation by means of a pin 95 which is adapted to be inserted through any one of a series of perforations 96 formed in the disk 89 and introduced into a single perforation or depression 97 formed on the end of the reservoir 82 opposite a reading line 98 on the reservoir. The perforations 96 are arranged opposite graduations 99 on the disk 89, which, when registering with the reading line 98, indicate the time required for the discharge of a sufficient volume of water through the opening 86 and into the bucket 64 to overbalance the weight 68.

In the operation of the invention, a quantity of feed is placed in the hopper 14 and a quantity of water is placed in the reservoir 82, whereupon the valve 87 is adjusted by means of the disk 89 to time the discharge of the water from the pan 83 into the bucket 64. Assume that the parts are positioned as shown in Figs. 1, 2 and 4 and that the valve 87 is adjusted so that a length of time approximately two hours is necessary for sufficient water to be discharged from the pan 83 into the bucket 64 to overbalance the weight 68. The moment the water delivered to the bucket 64 overbalances the weight 68 the lever 63 will rock downwardly at its outer end a sufficient distance to bring the stem 67 of the valve 66 into contact with the bottom of the trough 61; the bucket 64 moving downwardly a short distance after the engagement of the valve stem 67 by the trough 61 so as to open the discharge opening 65 and cause the water to pass from the bucket 64 into the trough 61 and from thence into the bucket 53. The downward movement of the forward end of the lever 63 rocks the rear end upward against the stop 71, thereby releasing the pivoted stock block 69 which will gravitate into its lowermost position as indicated in dotted lines in Fig. 1, whereupon the upper end of the stop block will engage the underside of the lever 63 and thereby lock the lever against movement with the bucket 64 in its lowermost position and the valve 66 open so that the entire contents of the bucket 64 will be discharged therefrom before the lever 63 is restored to normal by the weight 68. The bucket 64 is emptied in a few moments' time and the water passing therefrom into the bucket 53 is directed through the tube 51 into the bucket 47. The discharge opening 49 of the bucket 47 is restricted so that the bucket 47 will be filled before any appreciable amount of the water is discharged therefrom so that the weight of the water in the bucket 47 will act to depress the outer end of the arm 43 and elevate the inner end and the empty bucket 48 thereon. The rocking movement of the arm 43 will operate through the pawl 42 and ratchet 41 to rotate the wheel 37 in the direction indicated by the arrow thereon in Fig. 1 a distance approximately corresponding to the length of a ratchet tooth 41 or the distance between adjacent teeth 40 on the wheel 37. This causes the pin 40 engaging the member 36 on the arm 34 to rock the latter outwardly and thereby operate through the rock shaft 32, arm 33 and link 35 to shift the rocker arm 25 into the position indicated in dotted lines in Fig. 4, thus opening the discharge aperture 25 in the plate 24 to the discharge opening 21 of the hopper 20 so that a quantity of feed will be discharged from the hopper 20 onto the ground through the opening 22; the hopper 20 being previously filled to a point according to the position of the telescoping tube 30 with a measured quantity of the feed which will be completely discharged from the hopper 20. The rearward movement of the upper end of the rocker arm 25 will actuate the plate 28 to close the hopper 14 during the discharge of the feed from the hopper 20. The downward movement of the forward end of the arm 43 will operate through the link 58, bell crank lever 56 and link 60 to swing the arm 55 in the direction indicated by the arrow —a— in Fig. 2 to dispose the bucket 54 beneath the discharge end of the trough 61. The downward movement of the outer end of the arm 43 also operates through the rod 75 and bell crank lever 72 to restore the pivoted locking block 69 to its normal position, thereby permitting the weight 68 to actuate the lever 63 and return the bucket 64 to its uppermost position. In operating the block 69 the arm 77 on the bell crank lever 72 engages the pin 81 on the block and as the arm 77 moves upward causes the pin and block to advance therewith, thus moving the upper end of the block downwardly away from the lever 63 and moving the side edge of the block 69 toward the lever 63 so that when the block 69 is partially turned the lever 63 will operate on the short end thereof to rock the block into its horizontal position and withdrawing the pin 81 clear of the arm 77. The upward movement of the rear end of the arm 43 operates through the rod 76 to rock the bell crank lever 73 and move the arm 77 thereon downwardly so that when the rear end of the arm 43 is in its uppermost position the positions of the bell crank levers 72 and 73 will be transposed from that shown in Fig. 1. The arm 77 on the bell crank lever 73 moving downward is engaged by the pin 81 being carried upward by the arm 77 on the bell crank lever 72 and is turned in opposition to the spring 78 on engagement of the pin 81 with the underside thereof so that arm 77 will move to the opposite side of the pin. The water in the bucket 47 will now be discharged into a suitable trough, not shown, simultaneous with the discharge of the feed from the hopper 20 and the bucket 47 will be maintained in its lowermost position by the combined action of the pawl 42 and the locking pawl 45 engaging the ratchet teeth 41 and the member 36 may be positioned clear of the pin 40 which previously operated the same and will extend adjacent a projection 101 on the forward portion of the arm 43. After a lapse of two hours the bucket 64 will again be filled and the lever 63 operated as before described, thereby discharging the contents of the bucket 64 into the bucket 54. The water thus delivered to the bucket 54 may be discharged through the tube 52 into the bucket 48, from whence it will be slowly discharged into the receiving trough through the restricted discharge tube 50; the weight of the water in the bucket 48 operating to rock the rear portion of the arm 43 downwardly and restoring the arm 43 to its normal position. During this operation the wheel 37 will be held stationary by the engagement of the locking pawl 45 with the teeth 41 and the pawl 42 will be retracted into engagement with another tooth of the ratchet in readiness for another operation of the latter. This movement of the arm 43 will restore the arm 55 to its normal position to replace the bucket 53 beneath the trough 61 and also operate to restore the stop block 69 to its normal position by actuating the bell crank lever 73. The upward movement of the forward end of the arm 43 causes the projection 101 to engage the member 36 on the arm 34 and acting to rock the arm 34 rearwardly to position the projection 36 in front of the succeeding pin 40 and at the same time rocking the rocker arm 25 back to its normal position as shown in full lines in Fig. 4, thus closing the discharge opening of the hopper 20 and opening the hopper 14 to deliver another charge of feed to the hopper 20. The parts will then be restored to the position shown in Figs. 1 and 2 of the drawings, and on the succeeding operation which will be effected after an interval of two hours another charge of feed and water will be delivered simultaneously.

By varying the time required to fill the bucket 64 by adjusting the valve 87 the discharge of the feed and water may be effected at any desired interval and as a means for preventing the discharge of the feed in the interval of time between the last feeding operation in the evening and the first feeding operation in the morning a space on the periphery of the wheel 37 is not provided with the pins 40 so that a number of forward impulses of the wheel 37 will not actuate the rocker arm 25.

What we claim is:

1. In a feed and water dispenser, the combination of a feed dispensing device, and water controlled means for actuating said dispensing device at predetermined intervals, and means for regulating the water controlling means to determine the time of operation of the feed dispensing device.

2. In a feed and water dispenser, the combination of a feed dispensing device, water dispensing mechanism, means controlled by the water passing through the dispensing mechanism for operating the feed dispensing device, whereby the feed and water are caused to be delivered simultaneously.

3. In a feed and water dispenser, the combination of a feed dispensing device, water dispensing mechanism, means controlled by the water passing through the dispensing mechanism for operating the feed dispensing device, whereby the feed and water are caused to be delivered simultaneously, and whereby a measured quantity of water will be delivered intermediate the combined delivery of feed and water.

4. In a feed and water dispensing apparatus, a feed dispensing mechanism, a rocker arm, means actuated by said rocker arm for operating the feed dispensing mechanism when the arm is rocked in one direction to discharge the feed, and water controlled means for operating said rocker arm in both directions.

5. In a feed and water dispenser, a feed dispensing mechanism, a rocker arm, means actuated by said rocker arm controlling the feed dispensing mechanism, buckets carried on the ends of said rocker arm having discharge outlets, and means for delivering measured quantities of water alternately to said buckets, whereby said rocker arm is operated.

6. In a feed and water dispenser, a feed dispensing mechanism, a rocker arm, means actuated by said rocker arm controlling the feed dispensing mechanism, buckets carried on the opposite ends of said rocker arm having discharge outlets, means for delivering measured quantities of water alternately to said buckets, whereby said rocker arm is operated, and means for adjusting the interval between the water delivering operations.

7. In a feed and water dispenser, a rocker arm, buckets having discharge outlets carried by said rocker arm, a swinging arm, a pair of buckets carried thereby, a conduit connecting one of said buckets to one of the buckets on the rocker arm, a conduit connecting the other buckets, a trough, means for delivering a measured quantity of water to said trough at predetermined intervals, and means actuated by the rocker arm for moving the swinging arm to position the buckets thereon alternately beneath the discharge end of the trough, whereby water will be delivered alternately to the buckets on the rocker arm.

8. In a feed and water dispenser, a rocker arm, buckets on the ends of said rocker arm, a swinging arm, a pair of buckets carried thereby, connections between said pair of buckets and the buckets on the rocker arm, a trough, means for delivering a measured quantity of water to said trough at predetermined intervals, means actuated by the rocker arm for operating the swinging arm to alternately position the buckets thereon beneath the discharge end of the trough, whereby water will be delivered alternately to the buckets on the rocker arm to actuate the latter, and means controlled by the operation of the rocker arm for discharging a measured quantity of feed.

9. In a feed and water dispenser, a rocker arm, buckets on the ends of said rocker arm, a swinging arm, a pair of buckets carried thereby, connections between said pair of buckets and the buckets on the rocker arm, a trough, a vertically movable bucket, means for normally disposing the bucket in its uppermost position, means for delivering a predetermined quantity of water to said vertically movable bucket in a predetermined length of time, whereby said bucket will be moved to its lowermost position, means for automatically discharging the contents of said bucket when in its lowermost position into said trough, and means for swinging the swinging arm to alternately position the buckets thereon beneath the discharge end of the trough, whereby water will be delivered to the buckets on the rocker arm.

10. In a feed and water dispenser, a trough, a vertically movable bucket, means for normally holding said bucket in its uppermost position, means for delivering a measured quantity of water to said bucket in a predetermined length of time, whereby said bucket is moved to its lowermost position, means for automatically discharging the water from said bucket into the trough, when in its lowermost position, a rocker arm, a bucket on each end of said rocker arm, and means for delivering the water from the trough alternately to said buckets.

11. In a feed and water dispenser, a trough, a vertically movable bucket, means for normally holding said bucket in its uppermost position, means for delivering a measured quantity of water to said bucket in a predetermined length of time, whereby said bucket is moved to its lowermost position, means for automatically discharging the water from said bucket into the trough, when in its lowermost position, a rocker arm, a bucket on each end of said rocker arm, and means for delivering the water from the trough alternately to said buckets to actuate the rocker arm controlled by said rocker arm.

12. In a feed and water dispenser, a vertically movable bucket, means for normally holding said bucket in its uppermost position, means for delivering a measured quantity of water to said bucket in a predetermined time, whereby said bucket is moved to its lowermost position, a rocker arm, a bucket on each end of said rocker arm, means for automatically discharging the water from the vertically movable bucket, and means for delivering the water alternately to the buckets on the rocker arm to actuate the latter.

13. In a feed and water dispenser, a vertically movable bucket, means for normally holding said bucket in its uppermost position, means for delivering a measured quantity of water to said bucket in a predetermined time, whereby said bucket is moved to its lowermost position, a rocker arm, a bucket on each end of said rocker arm, means for automatically discharging the water from the vertically movable bucket, and means for delivering the water alternately to the buckets on the rocker arm to actuate the latter, and means controlled by the rocker arm for delivering a measured quantity of feed.

14. In a feed and water dispenser, a vertically movable bucket, means for normally holding said bucket in its uppermost position, means for delivering a measured quantity of water to said bucket in a predetermined length of time, whereby said bucket is moved to its lowermost position, means for discharging the water from said bucket when in its lowermost position, a feed dispensing device, and means operated by the water discharged from said bucket for actuating said feed dispensing device.

15. In a feed and water dispenser, a vertically movable bucket, means for normally holding said bucket in its uppermost position, means for delivering a measured quantity of water to said bucket in a predetermined length of time, whereby said bucket is moved to its lowermost position, a rocker arm, a bucket carried on each end of said rocker arm, means for discharging the water from the first-named bucket when in its lowermost position, means controlled by the rocker arm for directing the water discharged from said bucket alternately to the buckets on the rocker arm, and means for holding the vertically movable bucket in its lowermost position until its contents are discharged.

16. In a feed and water dispenser, a vertically movable bucket, means for normally holding said bucket in its uppermost position, means for delivering a measured quantity of water to said bucket in a predetermined length of time, whereby said bucket is moved to its lowermost position, a rocker arm, a bucket carried on each end of said rocker arm, means for discharging the water from the first-named bucket when in its lowermost position, means controlled by the rocker arm for directing the water discharged from said bucket alternately to the buckets on the rocker arm, and means for holding the vertically movable bucket in its lowermost position until its contents are discharged, and means controlled by the rocker arm for releasing the bucket holding means, whereby it will be permitted to be automatically restored to its normal position.

17. In a feed and water dispenser, a feed hopper, a slidable plate controlling the discharge of feed from said hopper, a rocker arm, a water receiving bucket on each end of said rocker arm, means for delivering a measured quantity of water to said buckets alternately at predetermined intervals, whereby said rocker arm is actuated, and means operated by said rocker arm for operating the slidable plate to effect the discharge of feed from the hopper at predetermined intervals.

18. In a feed and water dispenser, a feed hopper, a slidable plate controlling the discharge of feed from said hopper, a rocker arm, a bucket on each end of said rocker arm, means for delivering a measured quantity of water to said buckets alternately at predetermined intervals, whereby said rocker is operated, means actuated by said rocker arm for shifting the slidable plate to effect the discharge of feed from the hopper, and whereby the rocker arm is permitted to oscillate without actuating the slidable plate.

19. In a feed and water dispenser, a feed hopper, a slidable plate controlling the discharge of feed from said hopper, a rocker arm, a rotary disk, means for rotating said disk intermittently by oscillating said rocker arm, means on said disk for actuating the slidable plate at predetermined intervals in one direction, means on said rocker arm for moving the slidable plate in the opposite direction, and water controlled means for operating said rocker arm.

In witness that we claim the foregoing we have hereunto subscribed our names this 18th day of August, 1914.

KARL WOODIZKA.
JULIA WOODIZKA.

Witnesses:
EDMUND A. STRAUSE,
MARIE BATTEY.